(12) United States Patent
Gainey et al.

(10) Patent No.: US 8,095,067 B2
(45) Date of Patent: *Jan. 10, 2012

(54) FREQUENCY TRANSLATING REPEATER WITH LOW COST HIGH PERFORMANCE LOCAL OSCILLATOR ARCHITECTURE

(75) Inventors: Kenneth M. Gainey, Satellite Beach, FL (US); Kevin Negus, Hyattsville, WY (US); James C. Otto, West Melbourne, FL (US); James A. Proctor, Jr., Melbourne Beach, FL (US)

(73) Assignee: QUALCOMM Incorporated, San Diego, CA (US)

( * ) Notice: Subject to any disclaimer, the term of this patent is extended or adjusted under 35 U.S.C. 154(b) by 270 days.

This patent is subject to a terminal disclaimer.

(21) Appl. No.: 11/546,241

(22) Filed: Oct. 12, 2006

(65) Prior Publication Data
US 2007/0032192 A1  Feb. 8, 2007

Related U.S. Application Data

(63) Continuation of application No. 11/143,927, filed on Jun. 3, 2005, now Pat. No. 7,187,904.

(60) Provisional application No. 60/576,290, filed on Jun. 3, 2004.

(51) Int. Cl.
    *H04B 7/15* (2006.01)
(52) U.S. Cl. .............. 455/22; 455/15; 455/84
(58) Field of Classification Search ............. 455/7–25
    See application file for complete search history.

(56) References Cited

U.S. PATENT DOCUMENTS

| | | |
|---|---|---|
| 3,363,250 A | 1/1968 | Jacobson |
| 4,000,467 A | 12/1976 | Lentz et al. |
| 4,001,691 A | 1/1977 | Gruenberg et al. |
| 4,061,970 A | 12/1977 | Magneron et al. |
| 4,081,752 A | 3/1978 | Sumi |
| 4,124,825 A | 11/1978 | Webb et al. |
| 4,204,016 A | 5/1980 | Chavannes et al. |
| 4,334,323 A | 6/1982 | Moore |
| 4,368,541 A | 1/1983 | Evans |
| 4,509,206 A | 4/1985 | Carpe et al. |
| 4,679,243 A | 7/1987 | McGeehan et al. |
| 4,701,935 A | 10/1987 | Namiki et al. |
| 4,723,302 A | 2/1988 | Fulmer et al. |

(Continued)

FOREIGN PATENT DOCUMENTS

CN  1186401  7/1998

(Continued)

OTHER PUBLICATIONS

International Preliminary Report on Patentability issued from PCT in corresponding PCT application No. PCT/US05/19585 dated Jun. 6, 2007.

(Continued)

*Primary Examiner* — Philip Sobutka
(74) *Attorney, Agent, or Firm* — Linda G. Gunderson (57) ABSTRACT

A frequency translating repeater (120) for use in a time division duplex (TDD) radio protocol communications system includes local oscillator (LO) circuits (210, 310, and 410) to facilitate repeating by providing isolation, reduced phase noise, reduced pulling, and the like. Tunable LOs (441, 442) can be directly coupled to down-converters (413, 414) and up-converters (426, 427) for increased isolation, reduced phase noise, less stringent frequency accuracy, and a reduced potential for pulling.

7 Claims, 4 Drawing Sheets

U.S. PATENT DOCUMENTS

| | | | |
|---|---|---|---|
| 4,777,653 A | 10/1988 | Bonnerot et al. | |
| 4,783,843 A | 11/1988 | Leff et al. | |
| 4,820,568 A | 4/1989 | Harpell et al. | |
| 4,922,259 A | 5/1990 | Hall et al. | |
| 5,023,930 A | 6/1991 | Leslie et al. | |
| 5,095,528 A | 3/1992 | Leslie et al. | |
| 5,214,788 A | 5/1993 | Delaperriere et al. | |
| 5,220,562 A | 6/1993 | Takada et al. | |
| 5,280,480 A | 1/1994 | Pitt et al. | |
| 5,333,175 A | 7/1994 | Ariyavisitakul et al. | |
| 5,341,364 A | 8/1994 | Marra et al. | |
| 5,349,463 A | 9/1994 | Hirohashi et al. | |
| 5,368,897 A | 11/1994 | Kurihara | |
| 5,371,734 A | 12/1994 | Fischer et al. | |
| 5,373,503 A | 12/1994 | Chen et al. | |
| 5,383,144 A | 1/1995 | Kato | |
| 5,408,197 A | 4/1995 | Miyake et al. | |
| 5,408,618 A | 4/1995 | Aho et al. | |
| 5,430,726 A | 7/1995 | Moorwood et al. | |
| 5,446,770 A | 8/1995 | Urabe et al. | |
| 5,465,251 A | 11/1995 | Judd et al. | |
| 5,471,642 A | 11/1995 | Palmer et al. | |
| 5,485,486 A | 1/1996 | Gilhousen et al. | |
| 5,509,028 A | 4/1996 | Marque-Pucheu et al. | |
| 5,515,376 A | 5/1996 | Murthy et al. | |
| 5,519,619 A | 5/1996 | Seda | |
| 5,608,755 A | 3/1997 | Rakib et al. | |
| 5,610,916 A | 3/1997 | Kostreski et al. | |
| 5,648,984 A | 7/1997 | Kroninger et al. | |
| 5,654,979 A | 8/1997 | Levin et al. | |
| 5,659,569 A | 8/1997 | Dupuy | |
| 5,678,177 A | 10/1997 | Beasley | |
| 5,678,198 A | 10/1997 | Lemson et al. | |
| 5,684,801 A | 11/1997 | Amitay et al. | |
| 5,697,052 A | 12/1997 | Treatch | |
| 5,726,980 A | 3/1998 | Rickard et al. | |
| 5,732,334 A | 3/1998 | Miyake et al. | |
| 5,745,846 A | 4/1998 | Myer et al. | |
| 5,754,540 A | 5/1998 | Liu et al. | |
| 5,764,636 A | 6/1998 | Edsall et al. | |
| 5,767,788 A | 6/1998 | Ness | |
| 5,771,174 A | 6/1998 | Spinner et al. | |
| 5,784,683 A | 7/1998 | Sistanizadeh et al. | |
| 5,794,145 A | 8/1998 | Milam et al. | |
| 5,812,933 A | 9/1998 | Niki | |
| 5,815,795 A | 9/1998 | Iwai et al. | |
| 5,825,809 A | 10/1998 | Sim | |
| 5,852,629 A | 12/1998 | Iwamatsu et al. | |
| 5,857,144 A | 1/1999 | Mangum et al. | |
| 5,862,207 A | 1/1999 | Aoshima | |
| 5,875,179 A | 2/1999 | Tikalsky et al. | |
| 5,883,884 A | 3/1999 | Atkinson | |
| 5,884,181 A | 3/1999 | Arnold et al. | |
| 5,890,055 A | 3/1999 | Chu et al. | |
| 5,903,553 A | 5/1999 | Sakamoto et al. | |
| 5,907,794 A | 5/1999 | Lehmusto et al. | |
| 5,963,846 A | 10/1999 | Kurby et al. | |
| 5,963,847 A | 10/1999 | Ito et al. | |
| 5,987,304 A | 11/1999 | Latt et al. | |
| 6,005,855 A | 12/1999 | Zehavi et al. | |
| 6,005,884 A | 12/1999 | Cook et al. | |
| 6,014,380 A | 1/2000 | Hendel et al. | |
| 6,032,194 A | 2/2000 | Gai et al. | |
| 6,061,548 A | 5/2000 | Reudink et al. | |
| 6,088,570 A | 7/2000 | Komara et al. | |
| 6,101,400 A | 8/2000 | Ogaz et al. | |
| 6,108,364 A | 8/2000 | Weaver, Jr. et al. | |
| 6,128,512 A | 10/2000 | Trompower et al. | |
| 6,128,729 A | 10/2000 | Kimball et al. | |
| 6,163,276 A | 12/2000 | Irving et al. | |
| 6,188,694 B1 | 2/2001 | Fine et al. | |
| 6,188,719 B1 | 2/2001 | Collomby et al. | |
| 6,195,051 B1 | 2/2001 | McCoy et al. | |
| 6,202,114 B1 | 3/2001 | Dutt et al. | |
| 6,215,982 B1 | 4/2001 | Trompower et al. | |
| 6,219,739 B1 | 4/2001 | Dutt et al. | |
| 6,222,503 B1 | 4/2001 | Gietema et al. | |
| 6,272,351 B1 | 8/2001 | Langston et al. | |
| 6,285,863 B1 | 9/2001 | Zhang et al. | |
| 6,298,061 B1 | 10/2001 | Chin et al. | |
| 6,304,563 B1 | 10/2001 | Blessent et al. | |
| 6,304,575 B1 | 10/2001 | Carroll et al. | |
| 6,331,792 B1 | 12/2001 | Tonietto et al. | |
| 6,339,694 B1 | 1/2002 | Komara et al. | |
| 6,342,777 B1 | 1/2002 | Takahashi et al. | |
| 6,363,068 B1 | 3/2002 | Kinoshita et al. | |
| 6,370,185 B1 | 4/2002 | Schmutz et al. | |
| 6,370,369 B1 | 4/2002 | Kraiem et al. | |
| 6,377,612 B1 | 4/2002 | Baker et al. | |
| 6,377,640 B2 | 4/2002 | Trans et al. | |
| 6,384,765 B1 | 5/2002 | Sjostrand et al. | |
| 6,385,181 B1 | 5/2002 | Tsutsui et al. | |
| 6,388,995 B1 | 5/2002 | Gai et al. | |
| 6,393,299 B1 | 5/2002 | Mizumoto et al. | |
| 6,404,775 B1 | 6/2002 | Leslie et al. | |
| 6,441,781 B1 | 8/2002 | Rog et al. | |
| 6,473,131 B1 | 10/2002 | Neugebauer et al. | |
| 6,480,481 B1 | 11/2002 | Park et al. | |
| 6,501,955 B1 | 12/2002 | Durrant et al. | |
| 6,535,732 B1 | 3/2003 | McIntosh et al. | |
| 6,539,028 B1 | 3/2003 | Soh et al. | |
| 6,539,204 B1 | 3/2003 | Marsh et al. | |
| 6,549,542 B1 | 4/2003 | Dong et al. | |
| 6,549,567 B1 | 4/2003 | Fullerton et al. | |
| 6,563,468 B2 | 5/2003 | Hill et al. | |
| 6,574,198 B1 | 6/2003 | Petersson | |
| 6,628,624 B1 | 9/2003 | Mahajan et al. | |
| 6,664,932 B2 | 12/2003 | Sabet et al. | |
| 6,671,502 B1 | 12/2003 | Ogawa et al. | |
| 6,684,058 B1 | 1/2004 | Karacaoglu et al. | |
| 6,690,657 B1 | 2/2004 | Lau et al. | |
| 6,694,125 B2 | 2/2004 | White et al. | |
| 6,718,160 B2 | 4/2004 | Schmutz et al. | |
| 6,728,541 B2 | 4/2004 | Ohkura | |
| 6,766,113 B1 | 7/2004 | Al-Salameh et al. | |
| 6,781,544 B2 | 8/2004 | Saliga et al. | |
| 6,788,256 B2 | 9/2004 | Hollister | |
| 6,880,103 B2 | 4/2005 | Kim et al. | |
| 6,888,881 B1 | 5/2005 | Nagano | |
| 6,904,266 B1 | 6/2005 | Jin et al. | |
| 6,906,669 B2 | 6/2005 | Sabet et al. | |
| 6,934,511 B1 | 8/2005 | Lovinggood et al. | |
| 6,934,555 B2 | 8/2005 | Silva et al. | |
| 6,944,139 B1 | 9/2005 | Campanella et al. | |
| 6,957,042 B2 | 10/2005 | Williams | |
| 6,983,162 B2 | 1/2006 | Garani et al. | |
| 6,985,516 B1 | 1/2006 | Easton et al. | |
| 6,990,313 B1 | 1/2006 | Yarkosky et al. | |
| 7,027,418 B2 | 4/2006 | Gan et al. | |
| 7,027,770 B2 | 4/2006 | Judd et al. | |
| 7,043,203 B2 | 5/2006 | Miquel et al. | |
| 7,050,442 B1 | 5/2006 | Sugar et al. | |
| 7,050,452 B2 | 5/2006 | Sugar et al. | |
| 7,058,071 B1 | 6/2006 | Myles et al. | |
| 7,058,368 B2 | 6/2006 | Nicholls et al. | |
| 7,088,734 B2 | 8/2006 | Newberg et al. | |
| 7,103,344 B2 | 9/2006 | Menard et al. | |
| 7,120,930 B2 | 10/2006 | Maufer et al. | |
| 7,123,670 B2 | 10/2006 | Gilbert et al. | |
| 7,123,676 B2 | 10/2006 | Gebara et al. | |
| 7,132,988 B2 | 11/2006 | Yegin et al. | |
| 7,133,391 B2 | 11/2006 | Belcea et al. | |
| 7,133,460 B2 | 11/2006 | Bae et al. | |
| 7,139,527 B2 | 11/2006 | Tamaki et al. | |
| 7,167,526 B2 | 1/2007 | Liang et al. | |
| 7,187,904 B2 * | 3/2007 | Gainey et al. | 455/22 |
| 7,193,975 B2 | 3/2007 | Tsutsumi et al. | |
| 7,194,275 B2 | 3/2007 | Bolin et al. | |
| 7,200,134 B2 | 4/2007 | Proctor, Jr. et al. | |
| 7,215,964 B2 | 5/2007 | Miyake et al. | |
| 7,230,935 B2 | 6/2007 | Proctor, Jr. et al. | |
| 7,233,771 B2 | 6/2007 | Proctor, Jr. et al. | |
| 7,248,645 B2 | 7/2007 | Vialle et al. | |
| 7,254,132 B2 | 8/2007 | Takao et al. | |
| 7,299,005 B1 | 11/2007 | Yarkosky et al. | |
| 7,315,573 B2 | 1/2008 | Lusky et al. | |
| 7,319,714 B2 | 1/2008 | Sakata et al. | |

| | | |
|---|---|---|
| 7,321,787 B2 | 1/2008 | Kim et al. |
| 7,339,926 B2 | 3/2008 | Stanwood et al. |
| 7,352,696 B2 | 4/2008 | Stephens et al. |
| 7,406,060 B2 | 7/2008 | Periyalwar et al. |
| 7,430,397 B2 | 9/2008 | Suda et al. |
| 7,450,936 B2 | 11/2008 | Kim et al. |
| 7,457,587 B2 | 11/2008 | Chung |
| 7,486,929 B2 | 2/2009 | Van Buren et al. |
| 7,577,398 B2 | 8/2009 | Judd et al. |
| 7,590,145 B2 | 9/2009 | Futch et al. |
| 7,623,826 B2 | 11/2009 | Pergal et al. |
| 7,676,194 B2 | 3/2010 | Rappaport et al. |
| 7,729,669 B2 | 6/2010 | Van Buren et al. |
| 2001/0031646 A1 | 10/2001 | Williams et al. |
| 2001/0040699 A1 | 11/2001 | Osawa et al. |
| 2001/0050580 A1 | 12/2001 | O'Toole et al. |
| 2001/0050906 A1 | 12/2001 | Odenwalder et al. |
| 2001/0054060 A1 | 12/2001 | Fillebrown et al. |
| 2002/0004924 A1 | 1/2002 | Kim et al. |
| 2002/0018487 A1 | 2/2002 | Chen et al. |
| 2002/0034958 A1 | 3/2002 | Oberschmidt et al. |
| 2002/0045461 A1 | 4/2002 | Bongfeldt et al. |
| 2002/0061031 A1 | 5/2002 | Sugar et al. |
| 2002/0089945 A1 | 7/2002 | Belcea et al. |
| 2002/0101843 A1 | 8/2002 | Sheng et al. |
| 2002/0102948 A1 | 8/2002 | Stanwood et al. |
| 2002/0109585 A1 | 8/2002 | Sanderson |
| 2002/0115409 A1 | 8/2002 | Khayrallah et al. |
| 2002/0119783 A1 | 8/2002 | Bourlas et al. |
| 2002/0136268 A1 | 9/2002 | Gan et al. |
| 2002/0141435 A1 | 10/2002 | Newberg et al. |
| 2002/0146026 A1 | 10/2002 | Unitt et al. |
| 2002/0155838 A1 | 10/2002 | Durrant et al. |
| 2002/0159506 A1 | 10/2002 | Alamouti et al. |
| 2002/0163902 A1 | 11/2002 | Takao et al. |
| 2002/0177401 A1 | 11/2002 | Judd et al. |
| 2003/0026363 A1 | 2/2003 | Stoter et al. |
| 2003/0063583 A1 | 4/2003 | Padovani et al. |
| 2003/0139175 A1 | 7/2003 | Kim et al. |
| 2003/0179734 A1 | 9/2003 | Tsutsumi et al. |
| 2003/0185163 A1 | 10/2003 | Bertonis et al. |
| 2003/0211828 A1 | 11/2003 | Dalgleish et al. |
| 2003/0235170 A1 | 12/2003 | Trainin et al. |
| 2003/0236069 A1 | 12/2003 | Sakata et al. |
| 2004/0029537 A1 | 2/2004 | Pugel et al. |
| 2004/0038707 A1 | 2/2004 | Kim et al. |
| 2004/0047333 A1 | 3/2004 | Han et al. |
| 2004/0047335 A1 | 3/2004 | Proctor, Jr. et al. |
| 2004/0056802 A1 | 3/2004 | Hollister |
| 2004/0110469 A1 | 6/2004 | Judd et al. |
| 2004/0121648 A1 | 6/2004 | Voros |
| 2004/0131025 A1 | 7/2004 | Dohler et al. |
| 2004/0146013 A1 | 7/2004 | Song et al. |
| 2004/0157551 A1 | 8/2004 | Gainey et al. |
| 2004/0166802 A1 | 8/2004 | McKay, Sr. et al. |
| 2004/0176050 A1 | 9/2004 | Steer et al. |
| 2004/0198295 A1 | 10/2004 | Nicholls et al. |
| 2004/0208258 A1 | 10/2004 | Lozano et al. |
| 2004/0218683 A1 | 11/2004 | Batra et al. |
| 2004/0229563 A1 | 11/2004 | Fitton et al. |
| 2004/0235417 A1 | 11/2004 | Dean |
| 2004/0248581 A1 | 12/2004 | Seki et al. |
| 2004/0264511 A1 | 12/2004 | Futch et al. |
| 2005/0014464 A1 | 1/2005 | Larsson et al. |
| 2005/0030891 A1 | 2/2005 | Stephens et al. |
| 2005/0042999 A1 | 2/2005 | Rappaport et al. |
| 2005/0130587 A1 | 6/2005 | Suda et al. |
| 2005/0190822 A1 | 9/2005 | Fujii et al. |
| 2005/0201315 A1 | 9/2005 | Lakkis et al. |
| 2005/0254442 A1 | 11/2005 | Proctor et al. |
| 2005/0256963 A1 | 11/2005 | Proctor Jr. et al. |
| 2005/0286448 A1 | 12/2005 | Proctor et al. |
| 2006/0019603 A1 | 1/2006 | Pergal |
| 2006/0028388 A1 | 2/2006 | Schantz |
| 2006/0035643 A1 | 2/2006 | Vook et al. |
| 2006/0041680 A1 | 2/2006 | Proctor Jr. et al. |
| 2006/0045193 A1 | 3/2006 | Stolpman et al. |
| 2006/0052066 A1 | 3/2006 | Cleveland et al. |
| 2006/0052099 A1 | 3/2006 | Parker et al. |
| 2006/0056352 A1 | 3/2006 | Proctor et al. |
| 2006/0063484 A1 | 3/2006 | Proctor et al. |
| 2006/0063485 A1 | 3/2006 | Gainey et al. |
| 2006/0098592 A1 | 5/2006 | Proctor Jr. et al. |
| 2006/0183421 A1 | 8/2006 | Proctor et al. |
| 2006/0203757 A1 | 9/2006 | Young et al. |
| 2006/0262026 A1 | 11/2006 | Gainey et al. |
| 2007/0025349 A1 | 2/2007 | Bajic et al. |
| 2007/0025486 A1 | 2/2007 | Gainey et al. |
| 2007/0121546 A1 | 5/2007 | Zuckerman et al. |
| 2007/0286110 A1 | 12/2007 | James, Jr. et al. |
| 2008/0057862 A1 | 3/2008 | Smith et al. |
| 2008/0233942 A9 | 9/2008 | Kim et al. |

FOREIGN PATENT DOCUMENTS

| | | |
|---|---|---|
| EP | 0523687 | 1/1993 |
| EP | 0709973 A1 | 5/1996 |
| EP | 0715423 | 6/1996 |
| EP | 0847146 A2 | 6/1998 |
| EP | 0853393 A1 | 7/1998 |
| EP | 0860953 | 8/1998 |
| GB | 2272599 | 5/1994 |
| GB | 2351420 A | 12/2000 |
| JP | 06334577 | 0/1219 |
| JP | 62040895 | 2/1987 |
| JP | 63160442 | 7/1988 |
| JP | 64011428 | 1/1989 |
| JP | 2100358 A | 4/1990 |
| JP | 3021884 A | 1/1991 |
| JP | 05063623 | 3/1993 |
| JP | 05102907 | 4/1993 |
| JP | 6013947 A | 1/1994 |
| JP | 07030473 | 1/1995 |
| JP | 07-079187 | 3/1995 |
| JP | 07079205 | 3/1995 |
| JP | 07131401 | 5/1995 |
| JP | 08-097762 | 4/1996 |
| JP | 8274706 A | 10/1996 |
| JP | 09018484 A | 1/1997 |
| JP | 09130322 | 5/1997 |
| JP | 09-162903 | 6/1997 |
| JP | 09162801 | 6/1997 |
| JP | 09182155 | 7/1997 |
| JP | 09214418 | 8/1997 |
| JP | 10032557 A | 2/1998 |
| JP | 10107727 | 4/1998 |
| JP | 10135892 | 5/1998 |
| JP | 10242932 A | 9/1998 |
| JP | 11055713 | 2/1999 |
| JP | 11127104 | 5/1999 |
| JP | 11298421 | 10/1999 |
| JP | 2000031877 | 1/2000 |
| JP | 2000502218 T | 2/2000 |
| JP | 2000082983 A | 3/2000 |
| JP | 2000236290 A | 8/2000 |
| JP | 2000269873 | 9/2000 |
| JP | 2001016152 | 1/2001 |
| JP | 2001111575 A | 4/2001 |
| JP | 2001136115 | 5/2001 |
| JP | 2001244864 A | 9/2001 |
| JP | 2002033691 | 1/2002 |
| JP | 2002111571 A | 4/2002 |
| JP | 2002271255 A | 9/2002 |
| JP | 2003174394 A | 6/2003 |
| JP | 2003198442 | 7/2003 |
| JP | 2003244050 | 8/2003 |
| JP | 2004056210 | 2/2004 |
| JP | 2004328666 | 11/2004 |
| JP | 2004538682 | 12/2004 |
| JP | 2005072646 | 3/2005 |
| JP | 2005110150 | 4/2005 |
| JP | 2005236626 | 9/2005 |
| JP | 2005531202 | 10/2005 |
| JP | 2005531265 | 10/2005 |
| JP | 2006503481 | 1/2006 |
| JP | 2006505146 | 2/2006 |
| JP | 2006197488 A | 7/2006 |
| KR | 20040004261 A | 1/2004 |
| KR | 100610929 | 8/2006 |

| | | |
|---|---|---|
| RU | 2120702 C1 | 10/1998 |
| WO | WO2004002014 | 12/1931 |
| WO | WO9214339 | 8/1992 |
| WO | WO9715991 | 5/1997 |
| WO | WO9734434 | 9/1997 |
| WO | WO9858461 A1 | 12/1998 |
| WO | WO9959264 A2 | 11/1999 |
| WO | WO0050971 A2 | 8/2000 |
| WO | WO0152447 | 7/2001 |
| WO | WO0182512 A1 | 11/2001 |
| WO | WO0199308 | 12/2001 |
| WO | 0208857 | 1/2002 |
| WO | 0217572 | 2/2002 |
| WO | WO03013005 A2 | 2/2003 |
| WO | 2004002014 | 12/2003 |
| WO | WO2004001892 | 12/2003 |
| WO | WO2004001986 A2 | 12/2003 |
| WO | WO2004004365 A2 | 1/2004 |
| WO | WO2004032362 | 4/2004 |
| WO | WO2004036789 | 4/2004 |
| WO | WO2004038958 | 5/2004 |
| WO | WO2004062305 A1 | 7/2004 |
| WO | WO2005115022 | 12/2005 |

OTHER PUBLICATIONS

IEEE Std 802.11b-1999, "Part 11: Wireless LAN Medium Access Control (MAC) and Physical Layer (PHY) specifications: Higher-Speed Physical Layer Extension in the 2.4 GHz Band," IEEE-SA Standards Board, Sup to ANSI/IEEE Std. 802.11, 1999 Edition, Approved Sep. 16, 1999.

IEEE Std 802.11g-2003, "Part 11: Wireless LAN Medium Access Control (MAC) and Physical Layer (PHY) specifications: Amendment 4: Further Higher Data Rate Extension in the 2.4 GHz Band," IEEE Computer Soc Published by The Institute of Electrical and Electronics Engineers, Inc., Jun. 27, 2003.

IEEE Std 802.16-2001; "Part 16: Air Interface for Fixed Broadband Wireless Access Systems," IEEE Compute and the IEEE Microwave Theory and Techniques Society, Published by The Institute of Electrical and Electror Engineers, Inc., Apr. 8, 2002.

International Search Report—PCT/US2005/019585, International Searching Authority/US-Alexandria, Virginia-5, May 22, 2006.

Written Opinion—PCT/US2005/019585, International Searching Authority/US-Alexandria, Virginia, May 12, 2006.

Code of Federal Regulations, Title 47 Telecommunication; "Federal Communications Commission code part 15.407," Federal Communications Commission vol. 1, chapter I, part 15.407, Oct. 1, 2007 Edition.

IEEE Std 802.11-1999 (Reaff 2003), "Part 11: Wireless LAN Medium Access Control (MAC) and Physical Layer (PHY) Specifications," LAN MAN Standards Committee of the IEEE Computer Society; Paragraphs 7.2.3.1 and 7.2.3.9; Paragraph 7.3.2.4; Paragraphs 15.4.6.2 and 18.4.6.2, 2003.

Draft IEEE Standard for Local and Metropolitan Area Networks—Part 16: Air Interface for Fixed and Mobile Broadband Wireless Access Systems; Amendment for Physical and Medium Access COntrol Layers for Combined Fixed and Mobile Operation in Licensed Bands. IEEE P802.16E/D12, Oct. 2005.

European Search Report—EP05758871, Search Authority—Munich Patent Office, Jun. 11, 2010.

Translation of Office Action in Japanese application 2004-544751, corresponding to U.S. Appl. No. 10/531,078, citing W000050971, JP2002-111571, JP05-102907, JP63-160442, JP2000-502218, JP10-032557 and JP2000-082983. Dated Aug. 21, 2009.

Translation of Office Action in Japanese application 2004-553510, corresponding to U.S. Appl. No. 10/533,589, citing W000050971 and JP09-182155. Dated Sep. 18, 2009.

Translation of Office Action in Japanese application 2004-565505, corresponding to U.S. Appl. No. 10/563,471, citing JP08-097762 and JP2001-111575. Dated Aug. 4, 2009.

Translation of Office Action in Japanese application 2004-565505, corresponding to U.S. Appl. No. 10/563,471, citing JP08-018484. Dated Feb. 17, 2010.

Andrisano, et al., On the Spectral Efficiency of CPM Systems over Real Channel in the Presence of Adjacent Channel and CoChannel Interference: A Comparison between Partial and Full Response Systems, IEEE Transactions on Vehicular Technology, vol. 39, No. 2, May 1990.

First Office Action issued from the Chinese Patent Office in connection with corresponding Chinese application No. 200380101286.2, Jan. 19, 2007.

Draft Corrigendum to IEEE Standard for Local and Metropolitan Area Networks—Part 16: Air Interface for Fixed Broadband Wireless Access Systems, IEEE P802.16-2004/Cor1/D5.

Draft IEEE Standard for Local and Metropolitan Area Networks—Part 16: Air Interface for Fixed and Mobile Broadband Wireless Access Systems; Amendment for Physical and Medium Access Control Layers for Combined Fixed and Mobile Operation in Licensed Bands, May 2004.

First Report issued by IP Australia on Jul. 31, 2007 in connection with the corresponding Australian application No. 2003239577.

IEEE 802.16(e), Part 16: Air Interface for Fixed and Mobile Broadband Wireless Access Systems, 2005, Sections 8.4.10.2.1; 8.4.10.3.2.

Kannangara, et al., "Analysis of an Adaptive Wideband Duplexer with Double-Loop Cancellation." IEEE Transactions on Vehicular Technology, vol. 56, No. 4, Jul. 2007, pp. 1971-1982.

Kutlu, et al., "Performance Analysis of MAC Protocols Network," 1996 IEEE, pp. 494-499.

Specifications for 2.3 GHz Band portable Internet Service—Physical & Medium Access Control Layer, TTAS.KO-06.0082/R1, Dec. 2005.

Translation of Office Action in Japanese application 2004-515701, corresponding to U.S. Appl. No. 10/516,327, citing WO00050971, JP200-031877, JP2002-033691, JP2002-111571 and JP 11-127104. Dated May 25, 2010.

Translation of Office Action in Japanese application 2004-565505, corresponding to U.S. Appl. No. 10/563,471, citing JP08-097762, JP2001-111575, JP09-018484 and JP11-055713. Dated Sep. 14, 2010.

Translation of Office Action in Japanese application 2009-503041, corresponding to U.S. Appl. No. 11/730,361, citing W005115022, JP10-135892, JP2005-531265, 2006-503481, JP2005-531202 And JP2006-505146 . Dated Oct. 26, 2010.

Translation of Office Action in Korean application 2008-7026775, corresponding to U.S. Appl. No. 11/730,361, citing KR100610929 Dated Aug. 30, 2010.

Translation of Office Action in Korean application 2009-7010639, corresponding to U.S. Appl. No. 12/439,018, citing WO01052447 and US20040208258 Dated Nov. 15, 2010.

Dohler, Mischa, et al., Distributed PHY-layer mesh networks, 14th IEEE Proceedings on Personal, Indoor and Mobile Radio Communications, 2003., The United States of America, IEEE, Sep. 7, 2003, vol. 3, pp. 2543-2547.

Fujii, et al., Ad-hoc Cognitive Radio Cooperated with MAC Layer, Institute of Electronics, Information and Communication Engineers (IEICE) Technical Report, Japan, Institute of Electronics, Information and Communication Engineers (IEICE), May 4, 2005, vol. 105 (36), pp. 59-66.

Translation of Office Action in Japanese application 2007-513349 corresponding to U.S. Appl. No. 11/546,242, citing WO04032362, WO2004001986, JP09214418, JP07131401, JP2004056210, JP2000082983, JP09130322, JP2003244050, JP2003198442, US6377612, JP2006503481, JP2002111571, JP09162801, JP2005531202, WO2004001892 and JP10107727 dated Nov. 16, 2010.

Translation of Office Action in Japanese application 2009-526736 corresponding to U.S. Appl. No. 12/307,801 , citing US20040110469, US20060019603, JP2005072646, JP2001016152, JP11298421, JP2001136115, JP2005110150, JP2005236626, WO9715991 and WO0199308 dated Jan. 4, 2011.

Zimmermann, et al., "On the performance of cooperative diversity protocols in practical wireless systems," IEEE 58th Vehicular Technology Conference, 2003, The United States of America, IEEE, Oct. 6, 2003, vol. 4, pp. 2212-2216.

* cited by examiner

FREQUENCY TRANSLATING REPEATER WITH LOW COST HIGH PERFORMANCE LOCAL OSCILLATOR ARCHITECTURE

CROSS REFERENCE TO RELATED APPLICATIONS

This application is a continuation of application Ser. No. 11/143,927 filed on Jun. 3, 2005, allowed on Sep. 13, 2006. This application is also related to and claims priority from U.S. Provisional Application No. 60/576,290 filed Jun. 3, 2004 and is further related to U.S. patent application Ser. No. 10/529,037 filed Mar. 24, 2005 entitled LOCAL AREA NETWORK WITH REPEATER FOR ENHANCING NETWORK COVERAGE (claiming priority from PCT Application PCT/US03/28558), and U.S. Pat. application Ser. No. 10/533,589 filed May 3, 2005 entitled WIRELESS LCOAL AREA NETWORK REPEATER WITH DETECTION (claiming priority from PCT/US03/35050), the contents of which are incorporated herein by reference.

BACKGROUND OF THE INVENTION

The present invention relates generally to wireless networks and, particularly, the present invention relates to a local oscillator (LO) architecture in a frequency translating repeater. In particular, practical considerations must be addressed when implementing such a repeater in a system where many or all the components of the repeater including the LO circuits are implemented in an integrated circuit. One important practical consideration is the degree of on-chip isolation between the receive channel and the transmit channel in the integrated circuit.

In most frequency translating repeater systems, isolation between the transmit signal path and the receive signal path is a major concern. In particular, signal input stages and even auxiliary circuit input stages, such as LO stages, are susceptible to any in-band signal energy thus signal energy from other than the intended input signal can cause signal anomalies such as interference or "jamming" as will be appreciated. For example, if the LO used for frequency down-conversion is allowed to leak into the LO input of the frequency up-converter, a signal image will be transmitted that will have a jamming effect in the receiver. Further, if the LO used for frequency up-conversion in the transmit path is allowed to leak into the receiver frequency down-converter, the transmitted signal will be down-converted into the receive band and will also have a jamming effect.

The most common way in which signal energy from LO circuits can be cross coupled is via high-Q tank circuits, LC circuits tuned to resonate at particular frequencies. Since 80 dB of isolation is typically required between the transmit LO and the receive LO, and since, from a practical standpoint, 80 dB of isolation is generally considered nearly impossible between two such tank circuits on a single semiconductor chip, then the LO circuits for the transmit path and the receive path must be at different frequencies. A second path for leakage of signal energy sufficient to couple into LO stages is through the chip substrate. While the signal energy coupled through the substrate is typically at a much lower level than coupling through tank circuits as described, achieving 80 dB of isolation between two different LO circuits on the same substrate is still difficult.

Broad-band phase noise is another form of signal anomaly leading to receiver desensitization. A typical system, with a noise figure of, for example, 8 dB, can have a resulting system noise floor at −166 dBc/Hz. Thus, if an LO in the system has a broad-band phase noise of −150 dBc/Hz, which is above the noise floor, the phase noise will be imparted to the up-converted signal when passing through the up-converter. Further, if the output of a mixer associated with the LO is −10 dBm, the total phase noise that will be input to the power amplifier (PA) will be at around −160 dBm/Hz. The PA typically has a gain of 25 dB with a noise figure of 6 dB, moving the noise level up to around −135 dBm/Hz. Given a receiver to transmitter isolation of 30 dB, the resulting leakage noise at the system input would be −165 dBm/Hz. It should be appreciated that since the LO signal and the up-converted signal are typically not coherent, they do not directly add. The resulting leakage noise of −165 dBm/Hz as described above results in about 1-1.5 dB of desensitization. Accordingly, with LO frequency offsets at greater than, for example 10 MHz, LO broad-band noise levels above −150 dBc/Hz result in 1 for 1 receiver desensitization. In other words with noise levels at, for example, −149 dBc/Hz, the system is desensitized by 2 dB, with a noise level at −148 dBc/Hz the system is desensitized by 3 dB, and so on.

Still another problem associated with any switched LO architecture is pulling. Pulling is related to instability of the LO due to changes in the output impedance presented to them. LO pulling will cause disruption in the signal being mixed with the LO until the LO settles back on frequency. It will be appreciated that the amount of time associated with LO pulling is a function of the amount of impedance change and the loop bandwidth. In certain instances, for example in 802.11 signal scenarios, because the 802.11(g) signal has a very short preamble typically 8 μs long, even small amounts of pulling can be catastrophic. Thus an exemplary LO circuit would need to have LO settling within 1 us in order to prevent loss of signal lock or the like.

An example of isolation in a repeater using frequency translation can be found in U.S. patent application Ser. No. 10/529,037 listed and incorporated above. It should be noted however, that in order to ensure robust and effective operation, a frequency translating repeater must be capable of rapidly detecting the presence of a signal and must operate cooperatively in the environment in which it is repeating by providing adequate isolation from signal energy including energy from oscillators and the like, in order to effectively repeat the transmission.

SUMMARY OF THE INVENTION

Accordingly, in various exemplary and alternative exemplary embodiments, the present invention provides a local oscillator (LO) architecture in a frequency translating repeater configured to extend the coverage area in a wireless environment such as a WLAN environment, and, broadly speaking, in any TDD system including an IEEE 802.11b/g based system. The exemplary frequency translating repeater uses signal detection and isolation and can perform in TDD systems such as 802.11 based systems.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention

DETAILED DESCRIPTION OF THE INVENTION

Figure 1:
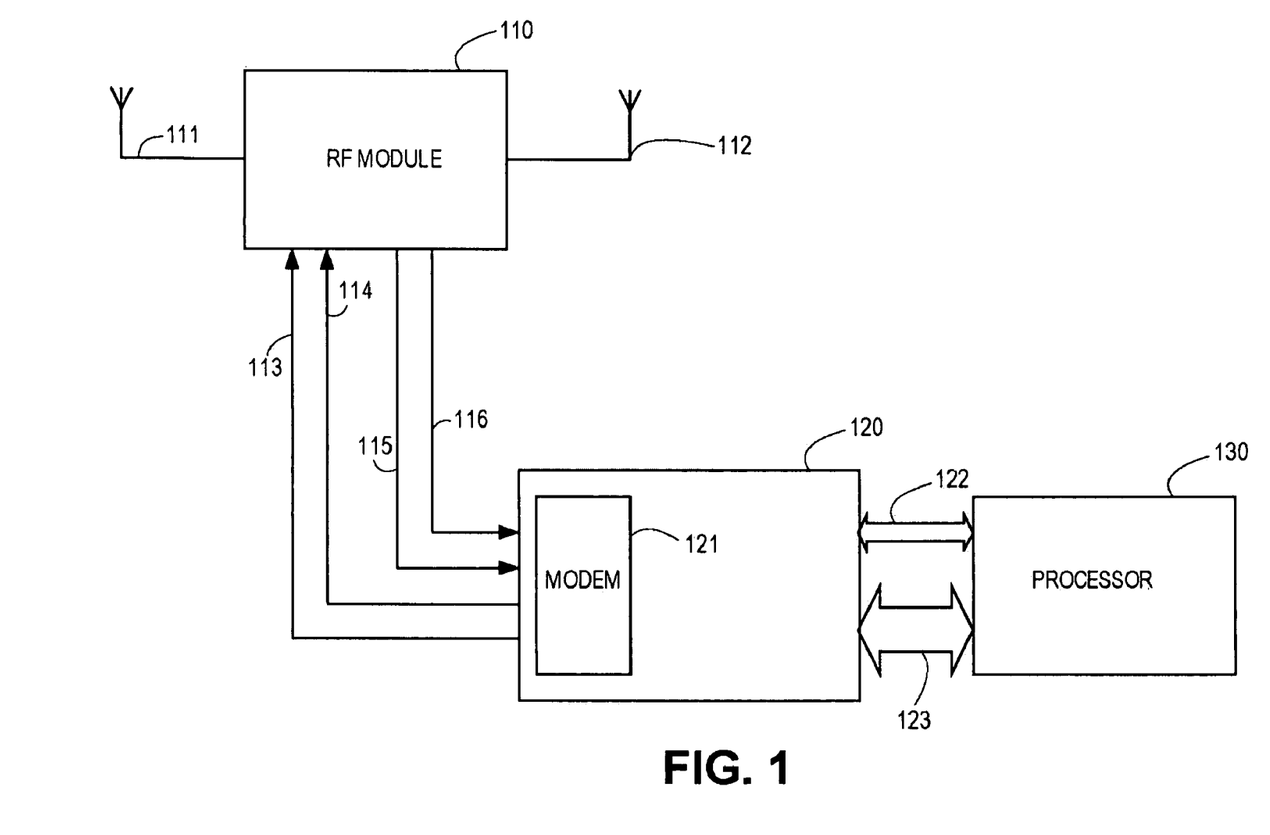
FIG. 1 is a block diagram illustrating components of an exemplary frequency translating repeater.

To better appreciate the basic components of an exemplary repeater, reference is made to FIG. 1. A simplified diagram of the major components of an exemplary frequency translating repeater are shown and include an RF module 110 having a first antennal 111 and a second antenna 112. The RF module 110 is bi-directionally coupled through lines 113, 114, 115, and 116 to a baseband module 120 having a modem 121. It will be appreciated that the modem 121, which can be a beacon modem, or the like, for beacon recovery and processing, requires a sampling clock for demodulation and a frequency carrier for modulation. It should be noted that in accordance with various exemplary embodiments, simultaneous demodulation of both frequency channels is desirable. Accordingly, the number of allowable IF frequencies and the required clock and LO frequencies is limited. Table 1 lists a set of allowable frequencies for an IF and sampling clock in accordance with various embodiments. It will be appreciated that the carrier frequency or frequencies for modulation can be selected from one of the IF frequencies in Table 1. Modulation can be performed on any channel supported in the exemplary repeater.

TABLE 1

| | Multiple of 22 MHz | | | | | | | |
| --- | --- | --- | --- | --- | --- | --- | --- | --- |
| | 3 | 4 | 5 | 6 | 7 | 8 | 9 | 10 |
| Digital IF, MHz | 66 | 88 | 110 | 132 | 154 | 176 | 198 | 220 |
| Required sampling freq, MHz | 264 | 352 | 440 | 528 | 616 | 704 | 792 | 880 |
| IF Candidate 1, MHz | 198 | 264 | 330 | 396 | 462 | 528 | 594 | 660 |
| IF Candidate 2, MHz | 330 | 440 | 550 | 660 | 770 | 880 | 990 | 1100 |
| IF Candidate 3, MHz | 462 | 616 | 770 | 924 | 1078 | 1232 | 1386 | 1540 |
| IF Candidate 4, MHz | 594 | 792 | 990 | 1188 | 1386 | 1584 | 1782 | 1980 |
| IF Candidate 5, MHz | 726 | 968 | 1210 | 1452 | 1694 | 1936 | 2178 | 2420 |
| IF Candidate 6, MHz | 858 | 1144 | 1430 | 1716 | 2002 | 2288 | 2574 | 2860 |

The exemplary repeater also includes a processor 130 connected to the baseband module 120 through a data link such as a data bus 123 and may also have an analog control connection 122, which can be a series of analog connections. The baseband module 120 is shown in an abbreviated form and will be described in greater detail hereinafter. It will be appreciated however that in the exemplary repeater, any automatic gain control (AGC) and LO instability must be settled within 1 μs. Assuming a loop bandwidth of 100 KHz, if the LO gets pulled by 100 KHZ or 1 loop bandwidth, 10 μs will be required to pull the LO into lock. Since 10 μs exceeds the settling requirement, it must be reduced by either widening the loop bandwidth or limiting the degree of pulling. However, to significantly widen the bandwidth, a more complex phase locked loop (PLL) circuit is required. Thus, the practical solution is to limit pulling to less than 1 KHz or with reference to the LO frequency of 2802 MHz 1 KHz/2802 MHz=0.356 ppm.

It will be appreciated that the exemplary repeater can include various components such as a reference oscillator band pass filters for filtering the transmit signal, a channel select switch for selecting transmit channels, high pass filters, and low pass filters. The RF module 110, which can be separately implemented in an Application Specific Integrated Circuit (ASIC), can route a transmit signal to one of two transmit antennas through a transmit switch. The transmit signal can be selected from one of the transmit channels such as TX_A or TX_B at channel select switch and can be input to a power amplifier (PA) followed by a power detector. It will be appreciated that in order to carefully control power, power conditioning can be used.

During detection, both A and B channels are configured to route signals through FET mixers, LNAs, and down-converters including surface acoustic wave (SAW) filters, LNAs, SAW filters, splitters, and log amplifiers. Digital signals can be extracted and from the A and B channels if present and input to a digital demodulator as described in greater detail herein below and can be used to perform network control and the like through beacon packets, control packets and the like.

Up-conversion and down-conversion can be performed through tunable frequency synthesizers as will also be discussed hereinbelow. It should be noted that the frequency outputs from the tunable synthesizers or tunable local oscillators (LOs) can be output through buffers to mixers for down-conversion and for up-conversion or can be directly coupled. In cases where buffers are used, the buffers can either be switched or always on, however in accordance with embodiments described herein, the buffers should be always enabled to reduces the adverse effects of switching transients on repeater performance as will be further described hereinbelow.

It will be appreciated that a digital signal can also be modulated by a digital modulator circuit and output into the transmit stream through a series of switches. The digital modulator circuit can include filters such as $3^{rd}$ order, Butterworth type low pass filters for filtering I and Q data, mixers for mixing I and Q data with a clock frequency corresponding to the channel frequency, a variable gain control, and the like. The output of the modulator can be inhibited by setting a switch. On the detect side the opposite channel from the transmit channel can be turned off, allowing for a higher degree of isolation from the transmitted signal. It should be noted that frequency conversion is accomplished by setting the LO used for up-conversion to the opposite of the LO used for down-conversion.

As noted, the digital demodulator and digital modulator are used to receive and transmit beacons, probe responses, and XOS packets as will be appreciated by one of ordinary skill. Additionally, a processor or sequencer can be used to control various operational modes of the exemplary repeater and allow the exemplary receiver to send data to other repeaters or access points (APs) capable of running a network management operating system such as an eXperimental operating system, Xylan operating system, extreme networks operating system (XOS), or the like.

Figure 2:
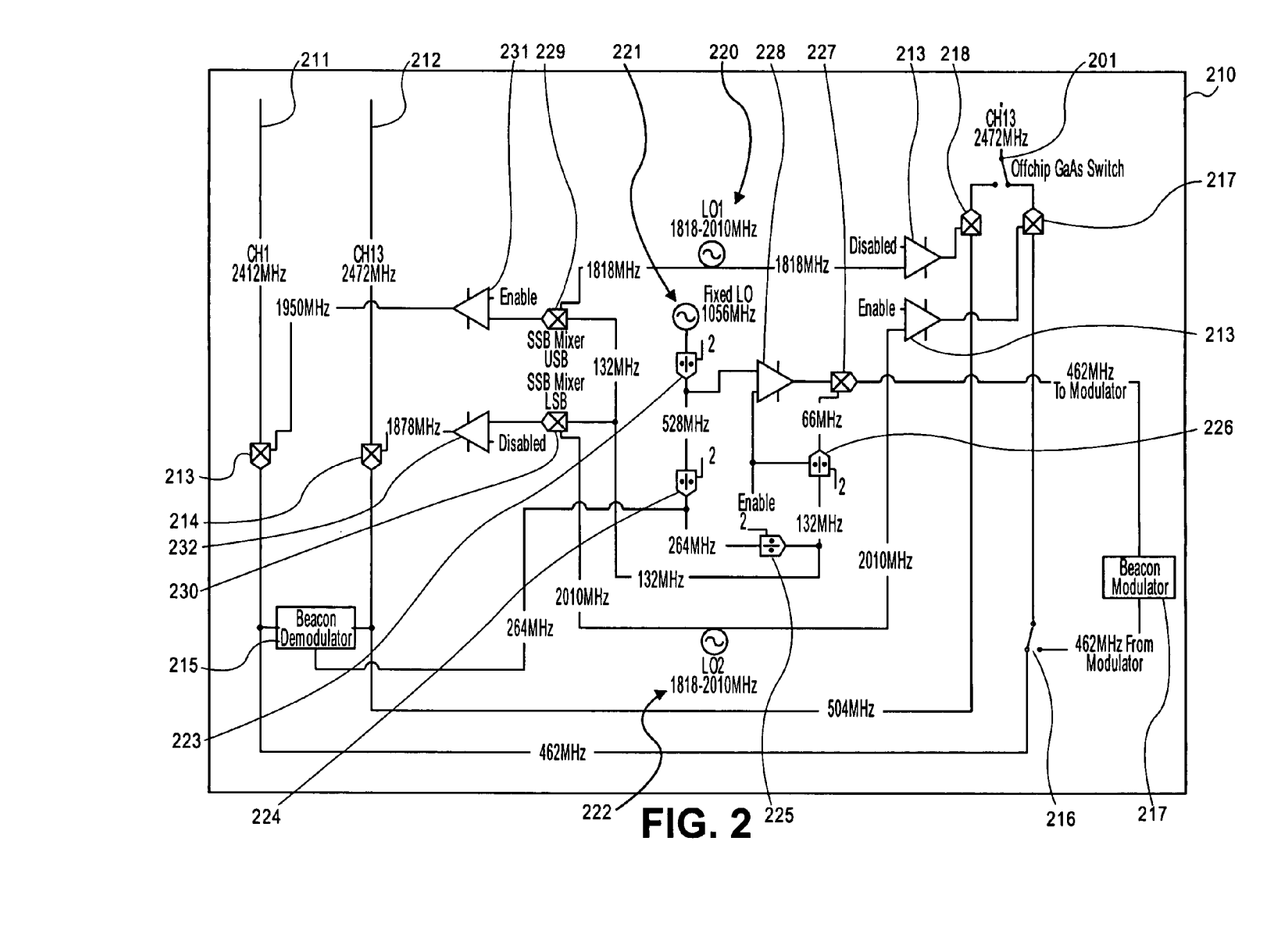
FIG. 2 is a detailed schematic diagram illustrating one embodiment of an exemplary local oscillator (LO) circuit in accordance with the present invention.
Figure 3:
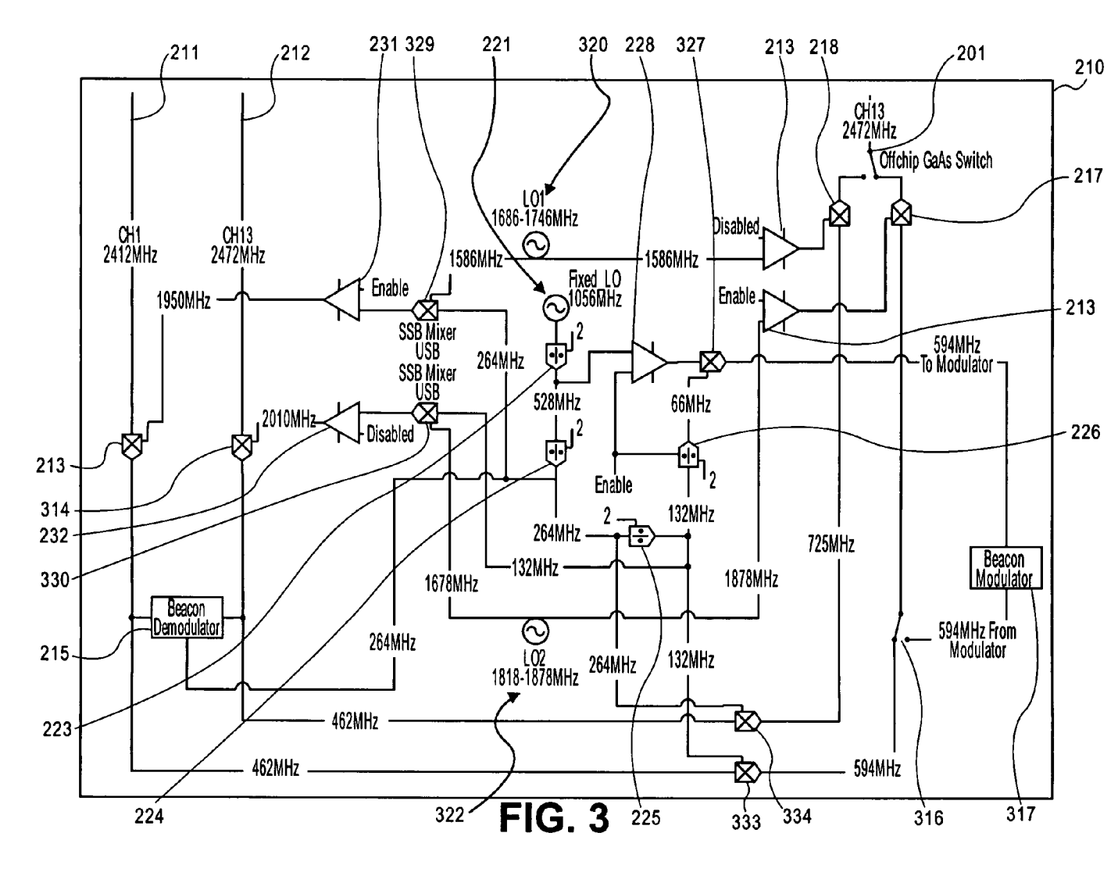
FIG. 3 is a detailed schematic diagram illustrating another embodiment of an exemplary local oscillator (LO) circuit in accordance with the present invention.
Figure 4:
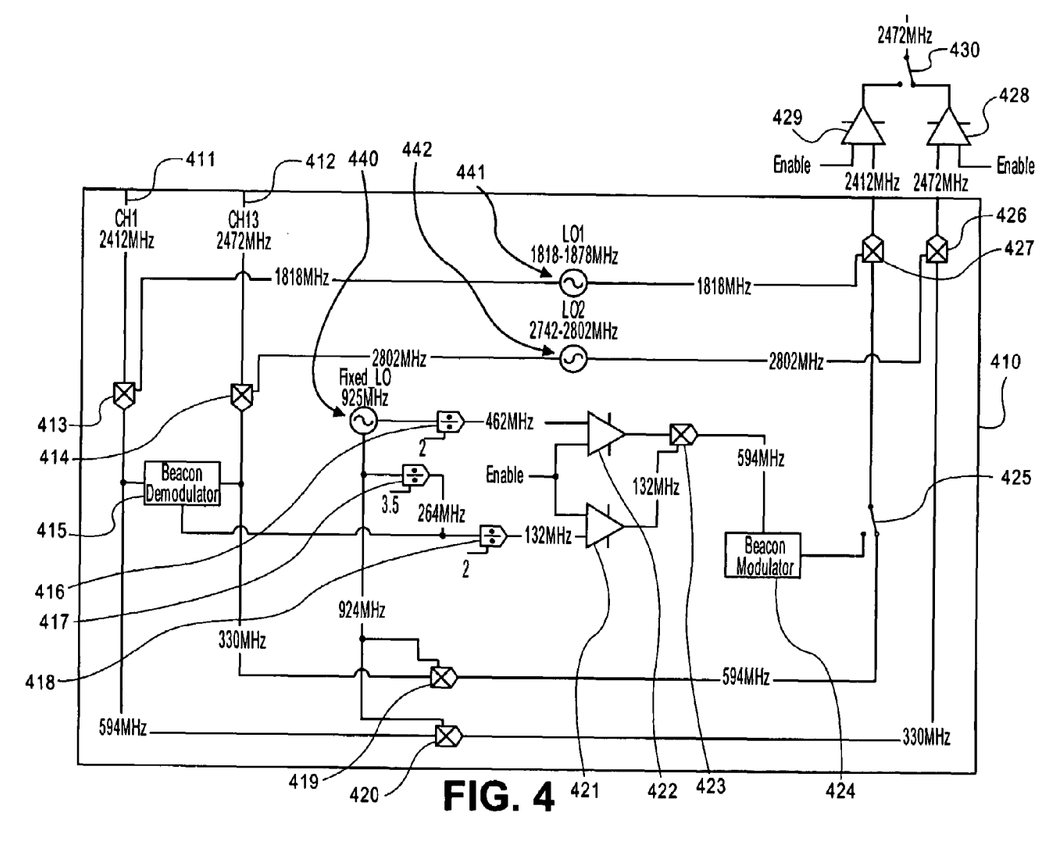
FIG. 4 is a detailed schematic diagram illustrating still another embodiment of an exemplary local oscillator (LO) circuit in accordance with the present invention.

With reference to FIG. 2, FIG. 3, and FIG. 4, several exemplary LO architectures are shown using two tunable LOs and one fixed LO. All of the architectures use at least two different IF frequencies and in some cases three. Some architectures use an offset LO approach while others use a high side/low side approach to obtain LO isolation. Phase noise can be optimized for the transmit side at the expense of phase noise on the receiver side or can be optimized for phase noise in both transmit and receive stages. Each architecture has a varying degree of complexity.

It should be noted that in accordance with various exemplary embodiments, it is desirable to have low speed antenna diversity. Low speed diversity involves choosing antennas during initial system configuration and maintaining the antenna configuration from one packet transmission to the next packet transmission. Low speed diversity configuration is performed by searching for beacons on all the channels using one down-converter connected to one antenna and then performing the search again using the other down-converter connected to the opposite antenna. All exemplary architectures should support low speed antenna diversity.

With reference to FIG. 2, an exemplary LO circuit 210 is shown, which as noted above, can be embodied as a RF ASIC or a cell or module within an ASIC or the like which, as would be appreciated by one of ordinary skill in the art, is true for all the LO circuits described herein. An advantage of the exemplary LO circuit 210 is the relatively simplicity of the architecture having, for example, a single stage up-converter. Some disadvantages of the LO circuit 210 are that 80 dB TX to RX isolation is required, and poor RX phase noise performance is to be expected, as are potential pulling issues on the TX side.

FIG. 3, shows an exemplary LO circuit 310. One advantage of the LO circuit 310 is that it does not require 80 dB of LO isolation. Some disadvantages are that complexity is increased with the inclusion of a two stage up-conversion, that three different IF frequencies are used requiring three different SAW filter designs, that poor RX phase noise performance is to be expected, and that potential pulling issues on the TX side are to be expected.

FIG. 4, shows an exemplary LO circuit 410. Some advantages of the LO circuit 410 are that it does not require 80 dB of LO isolation, the architecture is relatively simple, and the RX and TX phase noise performance is good. Some disadvantages are that the two stage up-conversion increases complexity, and that potential pulling issues are present on the TX and RX sides.

It can be seen that in view of the above noted advantages and disadvantages, a table such as Table 2 can be constructed to rate each of LO circuits 210, 310 and 410 on characteristics such as LO isolation, phase noise, pulling, and complexity.

TABLE 2

| METRIC | LO circuit 210 rating | LO circuit 310 rating | LO circuit 410 rating |
|---|---|---|---|
| LO Isolation | 2 | 4 | 4 |
| Phase Noise | 3 | 3 | 4 |
| Pulling | 3 | 3 | 3 |
| Complexity | 4 | 2 | 4 |

After review of the ratings in Table 2, it can be seen that a "score" can be assigned to each circuit based on the total of the ratings of all metrics. Thus, the score associated with LO circuit 210 is 12, with LO circuit 310 is 12, and with LO circuit 410 is 15. Accordingly, LO circuit 410 provides the highest score and will likely provided effective results although the LO circuit 210 or the LO circuit 310 can be used for satisfying various considerations in exchange for cost and/or performance tradeoffs. A spur analysis common in the art using components capable of generating up to 5th order harmonics can be used verify that no tones fall in channel and jam the receiver when circuit 410 is used. Additionally, to properly perform tests, it should also be noted that proper control of the components in the IF circuit chain will be required such that when the opposite channel is being used, the gain is reduced, select amplifiers are disabled, and the active IF up-converter is disabled.

With reference again to FIG. 2, the LO circuit 210 can be configured to facilitate repeating from channel 1 at 2412 MHz to channel 13 at 2472 MHz. Accordingly, the signal inputs 211 and 212 from channel 1 and channel 13 respectively can be received from an exemplary RF module such as RF module 110. The signal inputs 211 and 212 can be input to mixers 213 and 214 respectively for mixing with LO derived sideband signals. In the present example, the input signal 211 is designated for reception; thus, it is mixed at mixer 213 with a 1950 MHz signal for down-conversion as will be appreciated. The down-conversion signal is output from a buffer 231 selectively enabled after being generated by mixing an 1818 MHz signal generated from an LO 1 220 tunable from 1818 MHz to 2010 MHz in the upper side band portion 229 of a single side band (SSB) mixer. It will be appreciated that if channel 13 were selected for down-conversion, a 1878 MHz down-conversion signal is output from a buffer 232 selectively enabled (disabled in the present example) after being generated by mixing a 2010 MHz signal generated from an LO 2 222 tunable from 1818 MHz to 2010 MHz in the lower side band portion 230 of the exemplary SSB mixer.

Once down-converted, the signal 211 can pass to beacon demodulator 215 where any beacon signals, packets, or the like, can be extracted from the input signal 211 using a 264 MHz digital clock rate. It will be appreciated that the digital demodulator is coupled to a processor, sequencer, controller or the like, as described above, for example in connection with a digital demodulator and a sequencer. On the transmit side, network control or signaling information can be mixed with the outbound signal using a beacon modulator 217. To drive the modulator 217, a 132 MHz signal is generated by dividing a fixed LO 221 at 1056 MHz in dividers 223, 224, and 225. The 132 MHz signal can be further divided using divider 226 to generate a 66 MHz signal for mixing at mixer 227 with a 528 MHz signal output from buffer 228, when enabled, to generate a 426 MHz signal. The modulated output signal can be inserted into the signal path at switch 216 which is normally configured such that the beacon modulator 217 is out of circuit.

The down-converted signal can be coupled to output mixer 217 and switched to channel 13 using a switch 201 such as a GaAs switch located, for example, off the chip. It will be appreciated that the mixer 217 can be coupled to buffer 213 which is enabled to provide an up-conversion signal at 2010 MHz generated by the LO 2 222. In the event the repeating is from channel 13 to channel 1, a signal 212 on channel 13 can be down-converted in mixer 214, using a 1878 MHz generated from buffer 232 by mixing the 2010 MHz signal generated from LO 2 222 and the 132 MHz signal generated as described above using dividers 223, 224, and 225 to divide the 1056 MHz signal generated from the fixed LO 221. The down-converted signal can be input to the beacon demodulator 215 as described for retrieving any modulated signaling data. The down-converted signal can then be input to mixer 218 where it can be up-converted using the 1818 MHz signal generated from LO 1 220 and output from buffer 213 when enabled. The signal can then be repeated on channel 1 when the switch 201 is in the alternate position from what is shown. It should be noted that the LO circuit 210, as noted above, is the simplest architecture but sacrifices performance in the areas listed in Table 2.

With reference to FIG. 3, as with the example above, the LO circuit 310 can be configured to facilitate repeating from channel 1 at 2412 MHz to channel 13 at 2472 MHz. Accordingly, the signal inputs 211 and 212 from channel 1 and channel 13 respectively can be received from an exemplary RF module such as RF module 110 described above. The signal inputs 211 and 212 can be input to mixers 213 and mixer 314 respectively for mixing with LO derived sideband signals. In the present example, the input signal 211 is designated for reception; thus, it is mixed at mixer 213 with a 1950 MHz down-conversion signal as described above. The 1950 MHz down-conversion signal is output from a buffer 231 selectively enabled after being generated by mixing an 1686 MHz signal generated from an LO 1 320 tunable from 1686 MHz to 1746 MHz in the upper side band portion 329 of a single side band (SSB) mixer.

Once down-converted, the signal 211 can pass to beacon demodulator 215 where any beacon signals, packets, or the like, can be extracted from the input signal 211 using a 264 MHz digital clock rate generated by dividing the fixed LO 221 at 1056 MHz in divider 223 and 224. On the transmit side, network control or signaling information can be mixed with the outbound signal using a beacon modulator 317. To drive the modulator 317, the 132 MHz signal is divided as noted above from dividers 223, 224, and 225 can be further divided using divider 226 to generate a 66 MHz signal for mixing at mixer 327 with a 528 MHz signal output from buffer 228, when enabled, to generate a 594 MHz signal. The modulated output signal can be inserted into the signal path at switch 316 which is normally configured such that the beacon modulator 317 is out of circuit.

The down-converted signal can be coupled to an intermediate mixer 333 and the output mixer 217 and switched to channel 13 using the switch 201. The mixer 333 mixes the 132 MHz signal with the 462 MHz signal to generate a 594 MHz intermediate signal which is coupled to the mixer 217. It will be appreciated that the mixer 217 can be coupled to buffer 213 which is enabled to provide an up-conversion signal at 1878 MHz generated by the LO 2 322. In the event the repeating is from channel 13 to channel 1, the signal 212 on channel 13 can be down-converted in mixer 314, using a 2010 MHz signal generated from buffer 232 by mixing the 1878 MHz signal generated from LO 2 322 tunable from 1818 MHz to 1878 MHz and the 132 MHz signal in the lower side band portion 330 of the exemplary SSB mixer. If the signal 212 from channel 13 is used for down-conversion, the down-converted signal is coupled to an intermediate mixer 334 which outputs a 726 MHz intermediate signal. The intermediate signal can then be input to mixer 218 where it can be up-converted using a 1686 MHz signal generated from LO 1 320 and output from buffer 213 when enabled. The signal can then be repeated on channel 1 when the switch 201 is in the alternate position from what is shown. While the LO circuit 310 provides superior isolation, more circuit complexity is needed, for example in the form of additional mixers such as intermediate mixers 333 and 334.

In accordance with yet another exemplary embodiment, the LO circuit 410 shown in FIG. 4 provides superior performance in all areas listed in Table 2, with minor reduction in pulling performance. The LO circuit 410 provides a more fixed solution where the components are configured to provide repeating without the need to specifically enable on one channel and disable on the other channel. For example, an input signal 411 associated with channel 1 at 2412 MHz can be mixed in mixer 413 with an 1818 MHz signal from a LO 1 441, tunable between 1818 MHz and 1878 MHz. It will be noted that the 1818 MHz signal from the LO 1 441 is also coupled to the up-conversion mixer 427. An input signal 412 associated with channel 13 at 2472 MHz can be mixed in mixer 414 with a 2802 MHz signal from a LO 2 442, tunable between 2742 MHz and 2802 MHz. It will be noted that the 2802 MHz signal from the LO 2 442 is also coupled to the up-conversion mixer 426. Since, unlike the LO circuit 310 and the LO circuit 410, the LO circuit 410 contains no buffers in the up-conversion and down-conversion circuits, circuit complexity is reduced. The down-converted signals output from the mixers 413 and 414 can be input to a beacon demodulator 415, which can be driven using a 264 MHz signal generated from a fixed LO 440 at 924 MHz divided by a divider 417. The beacon demodulator 415 is for demodulating signaling information which may be present on the signals 411 and 412, for example, as described above. The down-converted signals 411 and 412, now at intermediate frequencies of 594 MHz and 330 MHZ respectively, can be input to intermediate mixers 420 and 419 respectively where they are mixed with the 924 MHz signal from the fixed LO 440.

The effect of mixing in intermediate mixers 419 and 420 is to swap the frequencies on respective channels. Thus, the 330 MHz down-converted signal from channel 13 is converted to 594 MHz, and the 594 MHz down-converted signal from channel 1 is converted to 330 MHz. The swapped intermediate signals from the outputs of intermediate mixers 419 and 420 can be coupled to mixers 427 and 426 for up-conversion. The mixer 427 mixes the 1818 MHz signal from the LO 1 441 and the 594 MHz signal from intermediate mixer 419, which originated from channel 13, to form a 2412 MHZ signal associated with channel 1. Similarly, the mixer 426 mixes the 2802 MHz signal from the LO 2 442 and the 330 MHz signal from the intermediate mixer 420, which originated from channel 1, to form a 2472 MHz signal associated with channel 13. The signals from mixers 427 and 426 can be output through buffers 429 and 428 to output selection switch 430 shown in a position to repeat on the channel 13 frequency of 2472 MHz. Thus, the exemplary LO circuit 410 facilitates rapid changes in repeater channels since the repeater is configured to detect, down-convert and up-convert on both channels with the final output selection performed by the output selection switch 430 as noted.

One significant benefit associated with LO circuit 410 is the significant reduction in the frequency error to the repeated signal based on locking the LO 1 441 and the LO 2 442 to the same reference clock. By way of example, in LO circuit 410, in any signal path, the repeated signal will see three mixers configured as "high side, high side, low side" or "low side, high side, high side". It will be appreciated that "high side" refers to the LO mixing frequency being higher than the signal path frequency. Since each high side mix results in spectral inversion, it is necessary to have two high side mixes in each signal path to correct the spectral inversion caused by any one high side mix. Any offset between the two high sides mixers will be cancelled according to the error factor in ppm and the frequency of the LO.

Using an example, assume a reference with a drift rating of 15 ppm has drifted high by 10 ppm for a "high side, high side, low side" case. If a signal with an RF frequency=2412 GHz is input into a mixer with a high side LO normally at 3006 MHz, but now drifted to 3006.030060 MHz or 10 ppm, an IF signal at a frequency of 3006.030060 MHz−2412 GHz=594.030060 MHz will result, which is too high since the IF is normally at 594 MHz. Next, the high IF signal is injected into another mixer with a high side LO normally at 1056 MHz, but now drifted to 1056.010560 MHz high. The resulting IF signal is 1056.010560 MHz−594.030060 MHz=461.980500 MHz, which is too low since the IF is normally 462 MHz. The IF signal is then injected into an up-conversion mixer with a low side LO normally at 2000 MHz, but now drifted to 2000.020000 MHz. The resulting signal in 2000.020000 MHz+461.980500 MHz=2462.000500 MHz, which is high since the up-converted signal is normally at 2462 MHz. The resulting total TX error is 500 Hz/2462 MHz=0.203 ppm error which is less than the actual 10 ppm shift originally occurring in the reference.

In another example, it is again assumed a reference with a 15 ppm drift rating has drifted high by 10 ppm in a "low side, high side, high side" case. If a signal with an RF frequency=2462 GHz is input into a mixer with a low side LO normally at 2000 MHz, but now drifted to 2000.020000 MHz, an IF signal at a frequency of 2462 MHz−2000.020000 MHz=461.980000 MHz will result, which is too low since the IF signal is normally 462 MHz. Next, the IF signal is injected into another mixer with a high side LO normally at 1056 MHz, but that has drifted to 1056.010560 MHz. The resulting IF is at 1056.010560 MHz−461.980000 MHz=594.030560 MHz which is too high since the IF signal is normally at 594 MHz. The signal is then injected into an up-conversion mixer with a high side LO normally at 3006 MHz that has drifted to 3006.030060 MHz. The resulting up-converted signal is at 3006.030060 MHz−594.030560 MHz=2411.999500 MHz which is too low since the up-converted signal is normally at 2412 MHz. The resulting total TX error is 500 Hz/2412 MHz=0.207 ppm error.

Thus, the repeated signal is essentially corrected to near zero error based on the configuration of the LO circuits. The result of the corrective effect of using two high side mixes is that instead of requiring a reference whose frequency accuracy is related to the absolute system RF frequency, such as 2450 MHz, the accuracy of the reference can be related to the difference between the input frequency and the output frequency of the repeater, which in accordance with exemplary embodiments, is typically less than 100 MHz for 802.11b/g systems. The only error of concern is the error associated with signal input to the beacon demodulator, since the signal undergoes only one down conversion prior to coupling to the input stage of the demodulator. Since a 50 ppm margin of error is required to successfully demodulate a Quadrature Phase Shift Keyed (QPSK) signal, then a 15 ppm oscillator is adequate. If an exemplary Orthogonal Frequency Division Multiplexed (OFDM) detector can tolerate greater error, an oscillator with a greater error margin than 15 ppm can be used thus reducing costs. Since 15 ppm is a standard WLAN oscillator, it will be an adequate choice for an exemplary oscillator source particularly given that the 802.11g standard calls for no greater than 20 ppm clock error.

It will be appreciated that in accordance with, for example, tests conducted as described in the above referenced U.S. Provision Application Ser. No. 60/576,290 incorporated herein by reference, an exemplary repeater is capable of receiving an 802.11b waveform at 11 Mbps, as well as an 802.11g waveform at 54 Mbps and 6 Mbps and repeat them without excessive signal degradation. Each test injected the specific waveform at its minimum sensitivity on CH1 and then repeated then signal to CH11 at full power and then in a subsequent test CH6 at a reduced power. The repeated waveform was then checked to make sure that proper EVM was being repeated. With narrower SAW filters, the transmit power for adjacent channel repeating will improve even further. Thus it has been demonstrated that the exemplary repeater can easily receive a signal on CH1 at minimum sensitivity and repeat the signal to CH11 at full power. The repeater can repeat the signal to full power as long as 6 (5 MHz) channels of spacing are between the receiver and transmitter. Accordingly, a signal received on CH1 can be repeated on CH8-11 at full power. If repeating was desired on CH6 or CH7, output power would have to be reduced. Again, with improved SAW filters degradation should be only 1-2 dB for adjacent channels only.

In accordance with various exemplary embodiments, some parameters associated with the exemplary repeater are described in the following tables. An exemplary ASIC may be fabricated, for example, using a 0.35μ SiGe BiCMOS process. The specifications will change as the impedances are very different inside the ASIC.

TABLE 3

| Parameter | Maximum | Typical |
|---|---|---|
| Case Temperature | Storage −65 to 150° C. | Operating 0-70° C. |
| Junction Temperature | Operating 0-110° C. | 65° C. |
| Supply Voltage | Typical Voltage ±5% | 3.3 V and 5.0 V |
| Electrostatic Discharge Tolerance | 2000 V | |
| RF in | TBD | |
| I/O voltage | TBD | |

The Low Side Tunable Synthesize (Synth1) can be set in accordance with Table 4 below which lists the supported RF frequencies as they pertain to different countries and the associated LO frequencies for both the Low Side and High Side tunable synthesizers. The assumption is that the reference for all the synthesizers will be a 22 MHz TCXO and the tunable synthesizers will use a 1 MHz comparison frequency. Table 5 can be used to characterize the Synth 1.

TABLE 4

| CH Num | RF Freq (GHz) | LO Freq Low Side (GHz) | LO Freq High Side (GHz) | North America | Eur | Spain | France | Japan-MKK |
|---|---|---|---|---|---|---|---|---|
| 1 | 2.412 | 1.950 | 3.006 | x | x | | | x |
| 2 | 2.417 | 1.955 | 3.011 | x | x | | | x |
| 3 | 2.422 | 1.960 | 3.016 | x | x | | | x |
| 4 | 2.427 | 1.965 | 3.021 | x | x | | | x |
| 5 | 2.432 | 1.970 | 3.026 | x | x | | | x |
| 6 | 2.437 | 1.975 | 3.031 | x | x | | | x |
| 7 | 2.442 | 1.980 | 3.036 | x | x | | | x |
| 8 | 2.447 | 1.985 | 3.041 | x | x | | | x |

TABLE 4-continued

| CH Num | RF Freq (GHz) | LO Freq Low Side (GHz) | LO Freq High Side (GHz) | North America | Eur | Spain | France | Japan-MKK |
|---|---|---|---|---|---|---|---|---|
| 9 | 2.452 | 1.990 | 3.046 | x | x | x |   | x |
| 10 | 2.457 | 1.995 | 3.051 | x | x | x | x | x |
| 11 | 2.462 | 2.000 | 3.056 | x | x |   | x | x |
| 12 | 2.467 | 2.005 | 3.061 |   | x |   | x | x |
| 13 | 2.472 | 2.010 | 3.066 |   | x |   | x | x |
| 14 | 2.484 | 2.022 | 3.078 |   |   |   |   | x |

Note:
x denotes ch used in the indicated country.

TABLE 5

| Parameter | Minimum | Typical | Maximum |
|---|---|---|---|
| Center Frequency @ 1 MHz step | 1950 MHz | — | 2022 MHz |
| Reference Frequency |   | 22 MHz | 50 MHz |
| Synthesizer Ref Spurs | −50 dBc | −55 dBc |   |
| Frequency Step Size |   | 1 MHz |   |
| Lock Time |   | TBD | 10 ms |
| Phase Noise @ 10 KHz * |   | −82 dBc/Hz | −80 dBc/Hz |
| Phase Noise @ 100 KHz * |   | −92 dBc/Hz | −90 dBc/Hz |
| Phase Noise @ 1 MHz * |   | −130 dBc/Hz | −128 dBc/Hz |
| Phase Noise @ 10 MHz * |   | −152 dBc/Hz | −150 dB/Hz |

* Assuming 50 KHz Loop BW and 10 MHz (±10 ppm) Reference Oscillator

The Synth 2 can be characterized in Table 6 as follows.

TABLE 6

| Parameter | Minimum | Typical | Maximum |
|---|---|---|---|
| Center Frequency @ 1 MHz step | 3006 MHz | — | 3078 MHz |
| Reference Frequency |   | 22 MHz | 50 MHz |
| Synthesizer Ref Spurs | −50 dBc | −55 dBc |   |
| Frequency Step Size |   | 1 MHz |   |
| Lock Time |   | TBD | 10 ms |
| Phase Noise @ 10 KHz * |   | −80 dBc/Hz | −78 dBc/Hz |
| Phase Noise @ 100 KHz * |   | −90 dBc/Hz | −88 dBc/Hz |
| Phase Noise @ 1 MHz * |   | −128 dBc/Hz | −126 dBc/Hz |
| Phase Noise @ 10 MHz * |   | −150 dBc/Hz | −148 dB/Hz |

* Assuming 50 KHz Loop BW and 10 MHz (±10 ppm) Reference Oscillator

The fixed frequency synthesizer can be characterized in Table 7 as follows.

TABLE 7

| Parameter | Minimum | Typical | Maximum |
|---|---|---|---|
| Center Frequency |   | 1056 MHz |   |
| Reference Frequency |   | 22 MHz | 50 MHz |
| Synthesizer Ref Spurs | −55 dBc | −60 dBc |   |
| Frequency Step Size |   | 1 MHz |   |
| Lock Time |   | TBD | 10 ms |
| Phase Noise @ 10 KHz * |   | −85 dBc/Hz | −83 dBc/Hz |
| Phase Noise @ 100 KHz * |   | −106 dBc/Hz | −103 dBc/Hz |
| Phase Noise @ 1 MHz * |   | −138 dBc/Hz | −136 dBc/Hz |
| Phase Noise @ 10 MHz * |   | −152 dBc/Hz | −150 dB/Hz |

* Assuming 50 KHz Loop BW and 10 MHz (±10 ppm) Reference Oscillator

One of ordinary skill in the art will recognize that as noted above, various techniques can be used to determine different local oscillator configurations and the like in the present invention other than those shown in the examples discussed and described herein. The examples further focus on repeating from channel 1 to channel 13 or vice versa. However, one of ordinary skill in the art will realize that such an example is for illustrative purposes and other repeating channel configurations can be used. Additionally, various components, such as RF module 210 and repeater module 200 and other elements can be combined into a single integrated device or can be implemented partially in ASICs and discrete components or the like. Other changes and alterations to specific components, and the interconnections thereof, can be made by one of ordinary skill in the art without deviating from the scope and spirit of the present invention.

What is claimed is:

1. A local oscillator (LO) circuit for facilitating repeating of a signal transmitted from a first station on a first frequency channel to a second station on a second frequency channel comprising the LO circuit:
   a first tunable LO associated with the first frequency channel, the first tunable LO tunable in a first frequency range lower than a frequency of the first frequency channel;
   a second tunable LO associated with the second frequency channel, the second tunable LO tunable in a second frequency range higher than a frequency of the second frequency channel, the second frequency range different from the first frequency range; and
   a first converter circuit for down-converting the signal on the first frequency channel to a first intermediate signal having a first intermediate frequency, and for down-converting the signal on the second frequency channel to a second intermediate signal having a second intermediate frequency.

2. A repeater circuit for facilitating repeating of a signal transmitted from a first station on a first frequency channel to a second station on a second frequency channel the repeater circuit comprising:
   an RF circuit configured to receive the signal on one of the first frequency channel and the second frequency channel, and to transmit a repeated version of the signal on an other of the first frequency channel and the second frequency channel; and
   a local oscillator (LO) circuit coupled to the RF circuit, the LO circuit including:
   a first tunable LO associated with the first frequency channel, the first tunable LO tunable in a first frequency range higher than a one of a frequency of the first frequency channel and a frequency of the second frequency channel; and
   a second tunable LO associated with the second frequency channel, the second tunable LO tunable in a second frequency range lower than an other of the frequency of the first frequency channel and the frequency of the second frequency channel; and a first converter circuit having a first high side mixer and a first low side mixer, the high side mixer associated with the one of the first frequency channel and the second frequency channel, and the first low side mixer associated with the other of the first frequency channel and the second frequency channel, the first converter generating a first intermediate signal from the one and generating a second intermediate signal from the other.

3. A non regenerative repeater for facilitating repeating of a first signal transmitted from a first station on a first frequency channel to a second station on a second frequency channel and for repeating of a second signal from the second station on the second frequency channel to the first station on the first frequency channel in a Time Division Duplex (TDD) manner, in a frequency translating repeater operating according to a wireless protocol, the frequency translating repeater comprising:

a local oscillator (LO) circuit having a first tunable LO and a second tunable LO, the first tunable LO associated with the first frequency channel and the second tunable LO associated with the second frequency channel;

a down-converter circuit coupled to the first tunable LO and the second tunable LO, the first tunable LO coupled to a first mixer associated with the down-converter circuit and the second tunable LO coupled to a second mixer associated with the down-converter circuit, the down-converter circuit for generating a first intermediate signal and a second intermediate signal;

an up-converter circuit having a third mixer associated with a first up-converted intermediate signal generated from the first intermediate signal, and a fourth mixer associated with a second up-converted intermediate signal generated from the second intermediate signal.

4. A frequency translating repeater for facilitating repeating of a first signal transmitted from a first station on a first frequency channel to a second station on a second frequency channel and for repeating of a second signal from the second station on the second frequency channel to the first station on the first frequency channel in a Time Division Duplex (TDD) manner, in a frequency translating repeater operating according to a wireless protocol, the frequency translating repeater comprising:

a local oscillator (LO) circuit having a first tunable LO and a second tunable LO, the first tunable LO associated with the first frequency channel and the second tunable LO associated with the second frequency channel;

a down-converter circuit coupled to the first tunable LO and the second tunable LO, the first tunable LO coupled to a first mixer associated with the down-converter circuit and the second tunable LO coupled to a second mixer associated with the down-converter circuit, the down-converter circuit for generating a first intermediate signal and a second intermediate signal;

an up-converter circuit having a third mixer associated with a first up-converted intermediate signal generated from the first intermediate signal, and a fourth mixer associated with a second up-converted intermediate signal generated from the second intermediate signal.

5. A repeater for facilitating repeating of a signal transmitted from a first station on a first channel to a second station on a second channel according to a wireless protocol, comprising:

a local oscillator (LO) circuit having a first tunable LO and a second tunable LO, the first tunable LO associated with the first frequency channel and the second tunable LO associated with the second frequency channel;

a down-converter circuit coupled to the first tunable LO and the second tunable LO, the first tunable LO coupled to a first mixer associated with the down-converter circuit and the second tunable LO coupled to a second mixer associated with the down-converter circuit, the down-converter circuit for generating a first intermediate signal and a second intermediate signal;

an up-converter circuit having a third mixer associated with a first up-converted intermediate signal generated from the first intermediate signal, and a fourth mixer associated with a second up-converted intermediate signal generated from the second intermediate signal; and an intermediate converter circuit having a fifth mixer and a sixth mixer, the fifth mixer associated with the first up-converted intermediate signal and the sixth mixer associated with the second up-converted intermediate signal.

6. A repeater configured to repeat a signal transmitted from a first station on a first frequency channel to a second station on a second frequency channel, the repeater comprising:

means for receiving the signal on one of the first frequency channel and the second frequency channel, and for transmitting a repeated version of the signal on an other of the first frequency channel and the second frequency channel;

oscillating means coupled to the means for receiving the signal and transmitting the repeated version of the signal, the oscillating means including:

a first tunable oscillating means associated with the first frequency channel, the first tunable oscillating means for tuning in a first frequency range higher than a one of a frequency of the first frequency channel and a frequency of the second frequency channel; and a second tunable oscillating means associated with the second frequency channel, the second tunable oscillating means for tuning in a second frequency range lower than an other of the frequency of the first frequency channel and the frequency of the second frequency channel; and a first converting means having a first mixing means and a second mixing means, the first mixing means associated with the one of the first frequency channel and the second frequency channel, and the second mixing means associated with the other of the first frequency channel and the second frequency channel, the first converting means for generating a first intermediate signal from the one and generating a second intermediate signal from the other.

7. The repeater of claim 6, further comprising:

second converting means including third mixing means associated with a first up-converted intermediate signal generated from the first intermediate signal, and a fourth mixing means associated with a second up-converted intermediate signal generated from the second intermediate signal.

* * * * *